(12) United States Patent
Katayama

(10) Patent No.: US 9,219,839 B2
(45) Date of Patent: Dec. 22, 2015

(54) IMAGE FORMING APPARATUS

(71) Applicant: CANON FINETECH INC., Saitama-ken (JP)

(72) Inventor: Masayoshi Katayama, Kashiwa (JP)

(73) Assignee: CANON FINETECH INC., Saitama-ken (JP)

( * ) Notice: Subject to any disclaimer, the term of this patent is extended or adjusted under 35 U.S.C. 154(b) by 0 days.

(21) Appl. No.: 14/044,927

(22) Filed: Oct. 3, 2013

(65) Prior Publication Data

US 2014/0118805 A1 May 1, 2014

(30) Foreign Application Priority Data

Oct. 31, 2012 (JP) .................... 2012-240900

(51) Int. Cl.
*H04N 1/04* (2006.01)
*H04N 1/12* (2006.01)
*H04N 1/00* (2006.01)

(52) U.S. Cl.
CPC ........... *H04N 1/121* (2013.01); *H04N 1/00554* (2013.01); *H04N 1/00588* (2013.01); *H04N 2201/0091* (2013.01)

(58) Field of Classification Search
CPC .............. H04N 1/121; H04N 1/00554; H04N 1/00588; H04N 2201/0091
USPC ......................... 358/498, 497, 474
See application file for complete search history.

(56) References Cited

U.S. PATENT DOCUMENTS

| 6,064,498 | A * | 5/2000 | Taniguchi et al. ............. 358/498 |
| 6,347,213 | B1 * | 2/2002 | Yamanaka et al. ............. 399/367 |
| 6,510,301 | B2 * | 1/2003 | Tanaka ................. G03G 15/605 399/125 |
| 8,164,806 | B2 * | 4/2012 | Yang .................... G03G 15/605 358/406 |
| 8,587,840 | B2 * | 11/2013 | Ito et al. ......................... 358/474 |
| 8,619,273 | B2 | 12/2013 | Mukai |
| 8,792,146 | B2 | 7/2014 | Ito et al. |
| 2005/0207810 | A1 * | 9/2005 | Fukumura ..................... 399/367 |
| 2007/0296135 | A1 | 12/2007 | Takahagi et al. |

FOREIGN PATENT DOCUMENTS

| CN | 102202154 | 9/2011 |
| CN | 102202155 | 9/2011 |
| EP | 2 369 417 | 9/2011 |
| JP | 2003-051906 A | 2/2003 |
| JP | 2011-205334 | 10/2011 |
| JP | 2012-25162 | 2/2012 |
| JP | 2012-49940 | 3/2012 |

* cited by examiner

*Primary Examiner* — Houshang Safaipour
(74) *Attorney, Agent, or Firm* — Fitzpatrick, Cella, Harper & Scinto

(57) ABSTRACT

An image forming apparatus, including: an apparatus main body including an image forming portion configured to form an image on a sheet; an image reading apparatus provided on an upper portion of the apparatus main body; a document feeding apparatus located on the image reading apparatus and configured to feed a document to the image reading apparatus; and a support portion configured to support the document feeding apparatus on the apparatus main body without the image reading apparatus in a state in which the document feeding apparatus is openable and closable with respect to the image reading apparatus.

6 Claims, 9 Drawing Sheets

FIG. 1
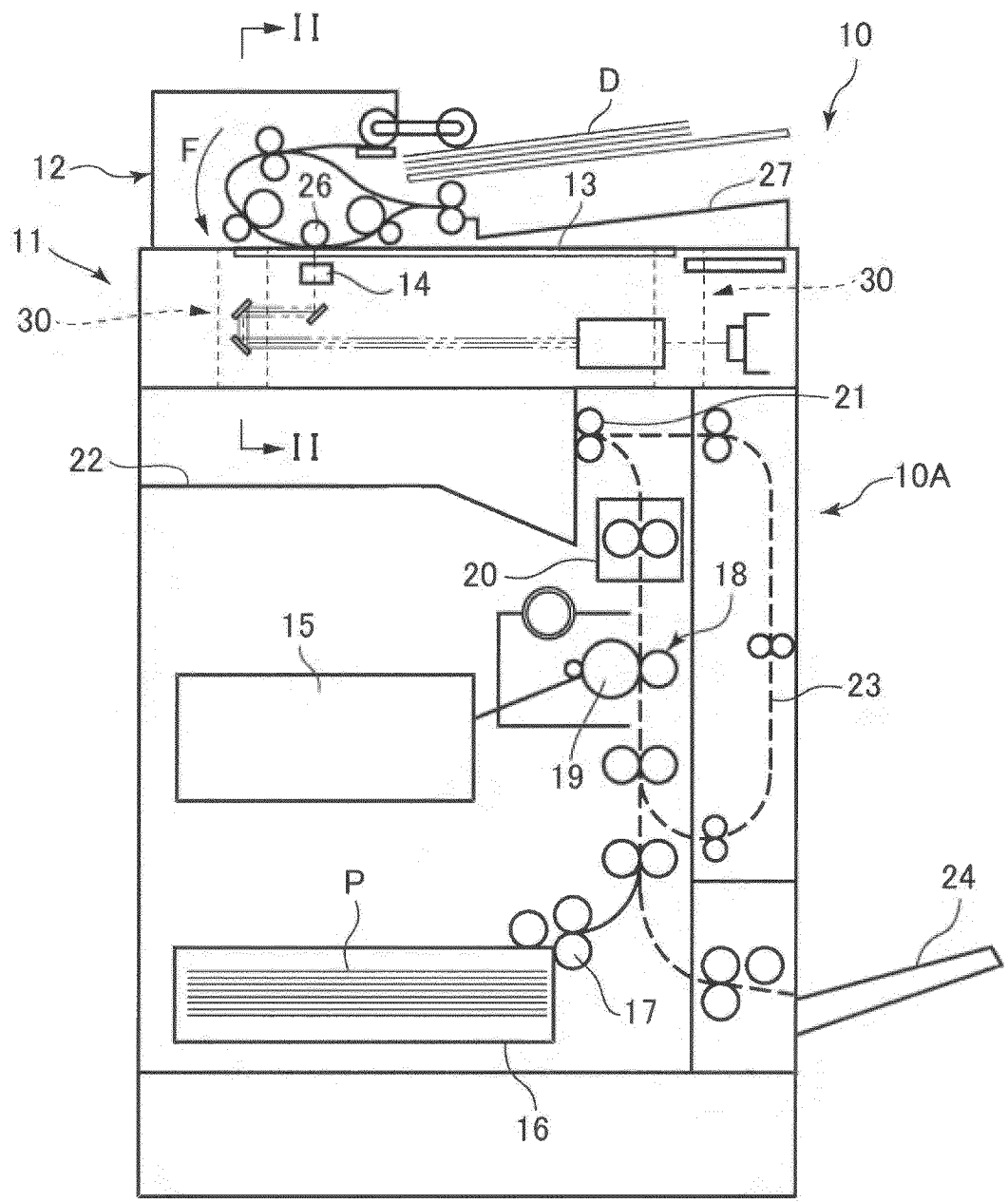
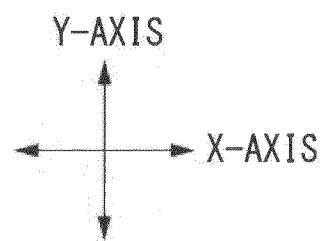

FIG. 9
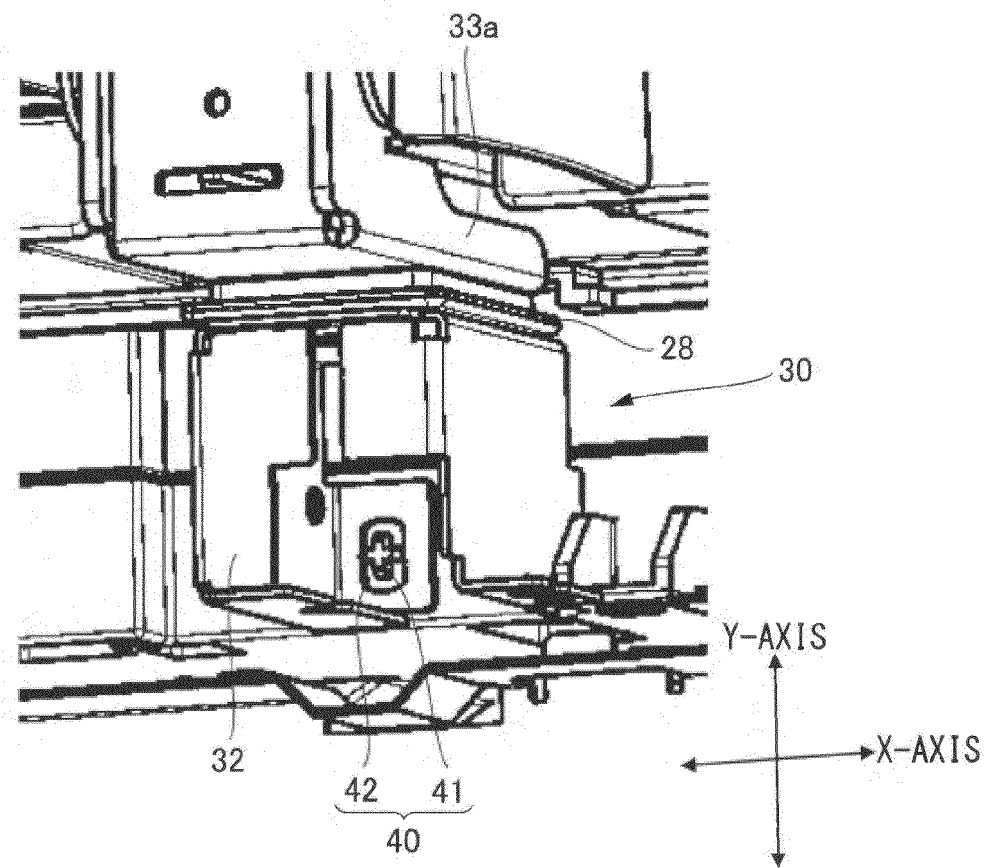
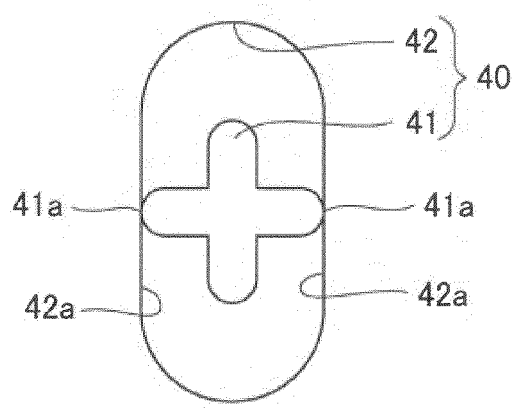
FIG. 10
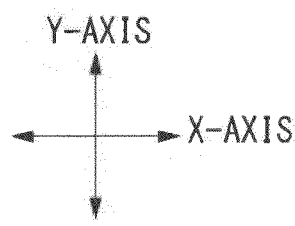

IMAGE FORMING APPARATUS

BACKGROUND OF THE INVENTION

1. Field of the Invention

The present invention relates to an image forming apparatus provided with an image reading apparatus and a document feeding apparatus which are stacked on an apparatus main body.

2. Description of the Related Art

Conventionally, there is known an image forming apparatus comprising: an apparatus main body which includes an image forming portion configured to form an image on a sheet; an image reading apparatus provided on an upper portion of the apparatus main body; and a document feeding apparatus provided on the image reading apparatus so as to be openable and closable through a hinge mechanism, and configured to feed a document to the image reading apparatus. The image reading apparatus is configured to read the document which is automatically fed by the document feeding apparatus, and transmit information on an image of the document to the image forming portion. The image forming portion is configured to form the image of the document on the sheet based on the information on the image which is transmitted from the image reading apparatus.

FIGS. 11, 12, and 13 are views illustrating a conventional hinge mechanism 1. An image reading apparatus 2 is mounted to a frame 3a serving as a skeletal structure of an apparatus main body 3. A hinge base 4 is fixed to a back portion 2a of the image reading apparatus 2 with screws 5a and 5b. One hinge piece 6a of a hinge 6 is fixed to an upper part of the hinge base 4. A document feeding apparatus 7 is fixed to another hinge piece 6b of the hinge 6.

In the hinge mechanism 1, however, when the document feeding apparatus 7 is pivoted about the hinge 6 and opened with respect to the image reading apparatus 2, a load of the document feeding apparatus 7 is applied in a concentrated manner to the back portion 2a of the hinge reading apparatus 2 to which the hinge 6 is fixed. Therefore, the image reading apparatus 2 needs to have a rigid structure.

In view of the above, Japanese Patent Application Laid-Open No. 2003-51906 discloses an image forming apparatus configured to reduce the load to be applied to the back portion of the image reading apparatus.

However, the image forming apparatus disclosed in Japanese Patent Application Laid-Open No. 2003-51906 has the following problem to be solved. That is, a moment in a front-back direction of the image reading apparatus, which is generated due to a self-weight of the document feeding apparatus, is applied to the reader in some degree, and hence the structure of the reader needs to be set more rigid to a degree corresponding to the moment to be applied.

SUMMARY OF THE INVENTION

The present invention provides an image forming apparatus configured to prevent a load of a document feeding apparatus, which is openable and closable with respect to an image reading apparatus, from being applied in a concentrated manner to a back portion of the image reading apparatus when the document feeding apparatus is pivoted and opened.

According to one embodiment of the present invention, there is provided an image forming apparatus, comprising: an apparatus main body including an image forming portion configured to form an image on a sheet; an image reading apparatus provided on an upper portion of the apparatus main body; a document feeding apparatus located on the image reading apparatus and configured to feed a document to the image reading apparatus; and a support portion configured to support the document feeding apparatus on the apparatus main body without the image reading apparatus in a state in which the document feeding apparatus is openable and closable with respect to the image reading apparatus.

Further features of the present invention will become apparent from the following description of exemplary embodiments with reference to the attached drawings.

BRIEF DESCRIPTION OF THE DRAWINGS

FIG. 1 is a schematic sectional view of an image forming apparatus taken along a sheet conveying direction.

FIG. 9 is an enlarged view illustrating a positioning mechanism of FIG. 4.

FIG. 10 is an enlarged view illustrating an engagement state between a protrusion and an elongated hole of the positioning mechanism.

DESCRIPTION OF THE EMBODIMENTS

Figure 2:
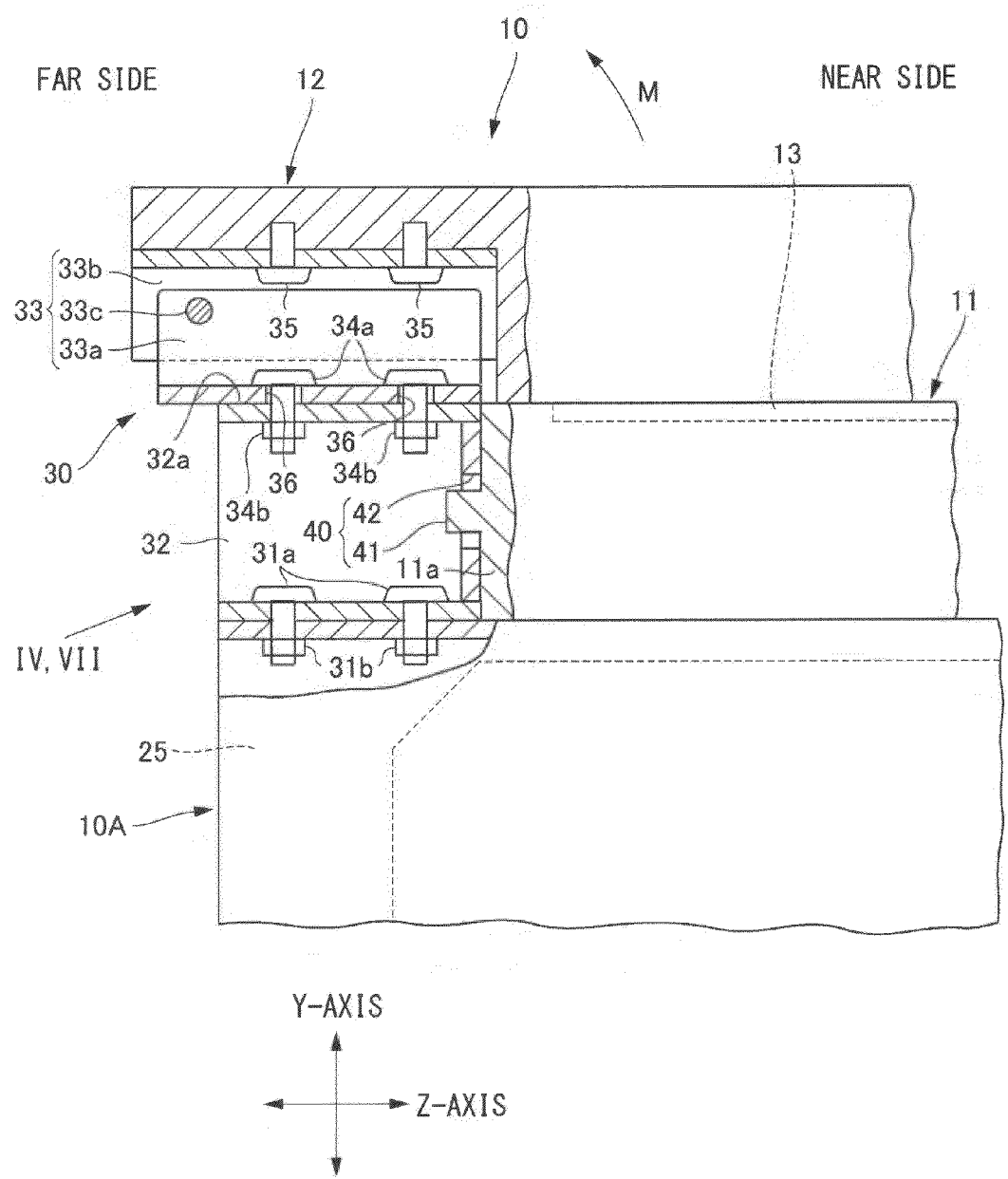
FIG. 2 is a schematic sectional view taken along the line II-II of FIG. 1, for illustrating a state in which an upper surface of an image reading apparatus is closed by a document feeding apparatus.

An image forming apparatus according to embodiments of the present invention will be hereinafter described with reference to the accompanying drawings.

FIG. 1 is a schematic sectional view of an image forming apparatus 10 taken along a sheet conveying direction. The image forming apparatus 10 comprises an apparatus main body 10A, an image reading apparatus 11, and a document feeding apparatus 12. The document feeding apparatus 12 is configured to automatically convey a document D to an upper surface of a platen glass 13 provided on an upper portion of a document reading portion of the image reading apparatus 11, and then automatically deliver the document D to a document delivery tray 27. The image reading apparatus 11 is configured to irradiate, with a light-emitting reading portion 14, the document D which is being fed and conveyed automatically by the document feeding apparatus 12 to sequentially read light reflected from the document D (perform sheet-through reading), and transmit information on an image of the document D to a laser scanner 15 as a digital signal.

The apparatus main body 10A is configured to copy the image of the document D on a sheet P based on the information on the image which is transmitted from the image reading apparatus 11. Note that, the apparatus main body 10A is further configured to form an image on the sheet P based on information on the image which is transmitted from an external facsimile, a personal computer, or the like. Further, the document feeding apparatus 12 is provided so as to be openable and closable with respect to the image reading apparatus 11 through hinge mechanisms (support portions) 30 described later. When a user raises and pivots the document feeding apparatus 12 in a direction indicated by the arrow M (FIG. 3), the upper surface of the platen glass 13 of the image reading apparatus 11 is opened so that the document D may be placed on the platen glass 13. When the user places the document D on the platen glass 13 and then pivots and tilts the document feeding apparatus 12 toward a near side (in a direction indicated by the arrow N in FIG. 3) to close the platen glass 13, the image reading apparatus 11 may read the document D (perform flat-bed reading).

A plurality of sheet cassettes 16 (FIG. 1 illustrates only one sheet cassette 16, and the other sheet cassettes 16 are omitted from FIG. 1) which stores sheets P of various sizes are mounted at a lower part of the apparatus main body 10A of the image forming apparatus 10. conveyance rollers 17 are configured to feed each of the sheets P from the corresponding sheet cassette 16, and convey the sheet P to a photosensitive drum 19 of an image forming portion 18. The photosensitive drum 19 is irradiated with a laser beam of the laser scanner 15 in advance so that a latent image is formed on the photosensitive drum 19. The latent image is developed with toner and formed into a toner image. The toner image is transferred from the photosensitive drum 19 onto the sheet P, and is fixed to the sheet P by a fixing device 20.

When the image is formed on one side of the sheet P but does not need to be formed on both sides of the sheet P, the sheet P is delivered to an internal tray 22 by a delivery roller pair 21. When the image needs to be formed on both sides of the sheet P, the surfaces of the sheet P are reversed through switchback conveyance, and the sheet P is conveyed along a re-conveyance path 23 to the image forming portion 18 again. In the image forming portion 18, a toner image is transferred onto another side of the sheet P, and is fixed to the sheet P by the fixing device 20. After that, the sheet P is delivered to the internal tray 22 by the delivery roller pair 21. Note that, the sheet P is fed not only from the sheet cassette 16, but also from a multipurpose tray 24.

As described above, the image forming apparatus 10 comprises: the apparatus main body 10A including the image forming portion 18 configured to form the image on the sheet P; the image reading apparatus 11 provided on an upper portion of the apparatus main body 10A; and the document feeding apparatus 12 located on the image reading apparatus 11 and configured to feed the document D to the image reading apparatus 11. Further, the document feeding apparatus 12 is coupled to and supported on the apparatus main body 10A through the two hinge mechanisms 30 in a state in which the document feeding apparatus 12 is openable and closable with respect to the image reading apparatus 11.

A hinge mechanism 30 will be hereinafter described with reference to FIGS. 2 to 10.

Figure 3:
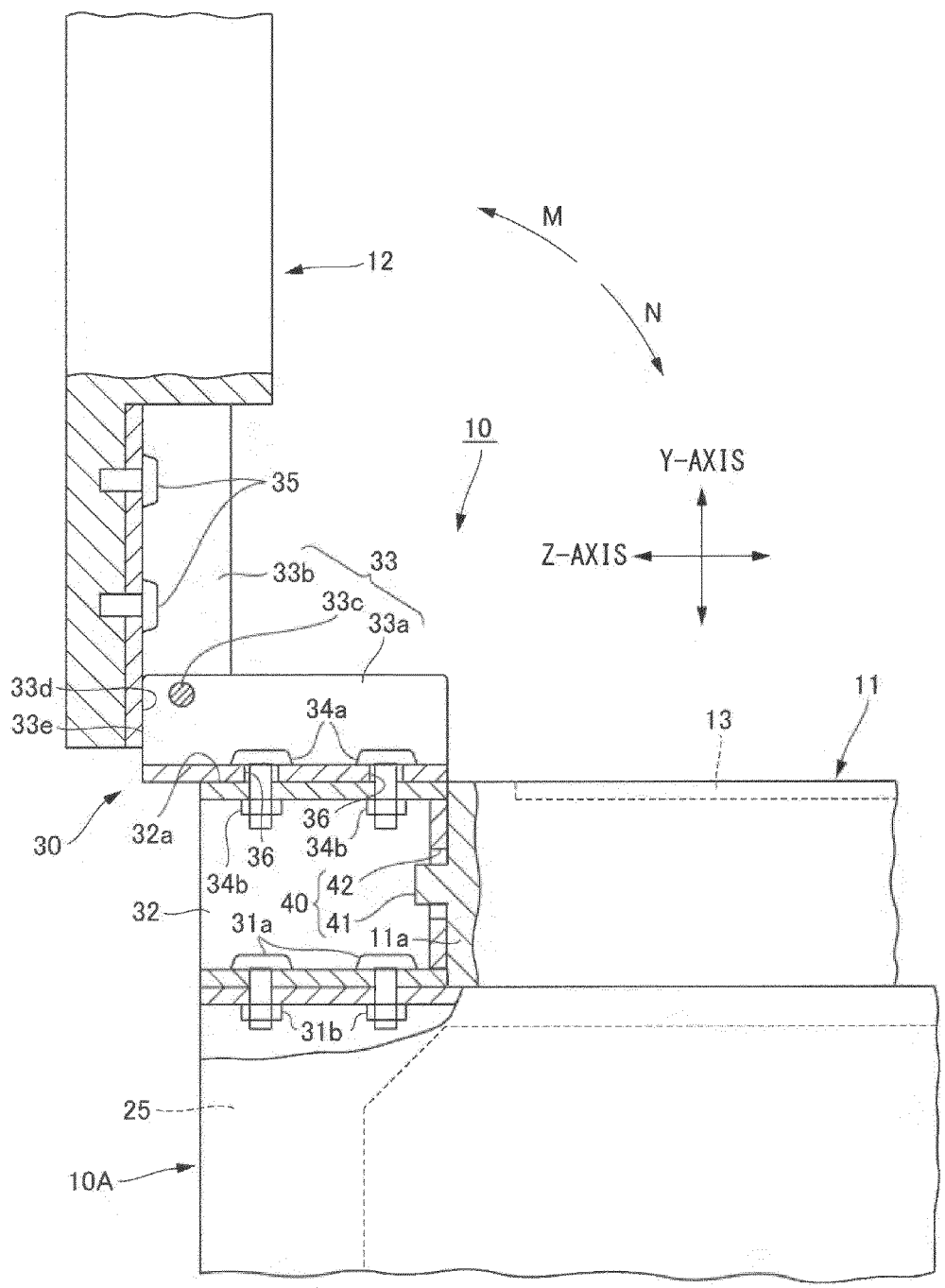
FIG. 3 is a schematic sectional view illustrating a state in which the document feeding apparatus is raised from the state of FIG. 2 toward a far side of the image forming apparatus to open the upper surface of the image reading apparatus.
Figure 4:
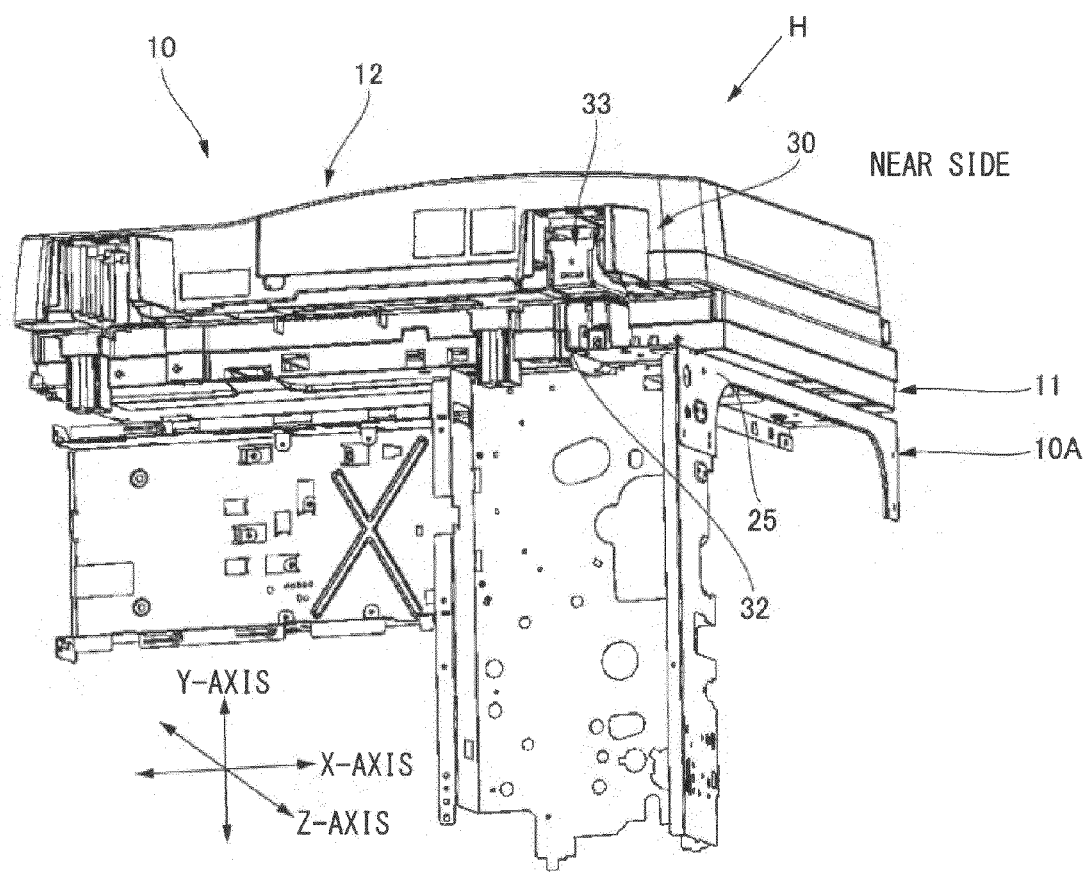
FIG. 4 is a view illustrating a hinge mechanism as viewed in a direction indicated by the arrow IV in FIG. 2.
Figure 5:
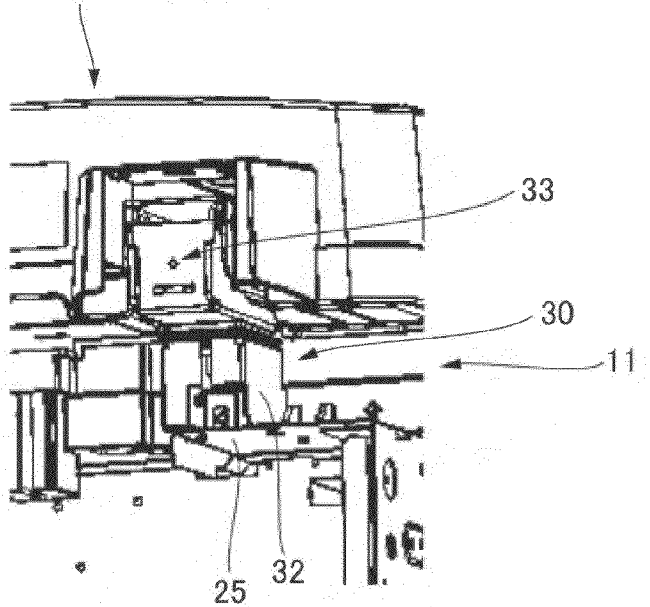
FIG. 5 is an enlarged view illustrating the hinge mechanism of FIG 4.
Figure 6:
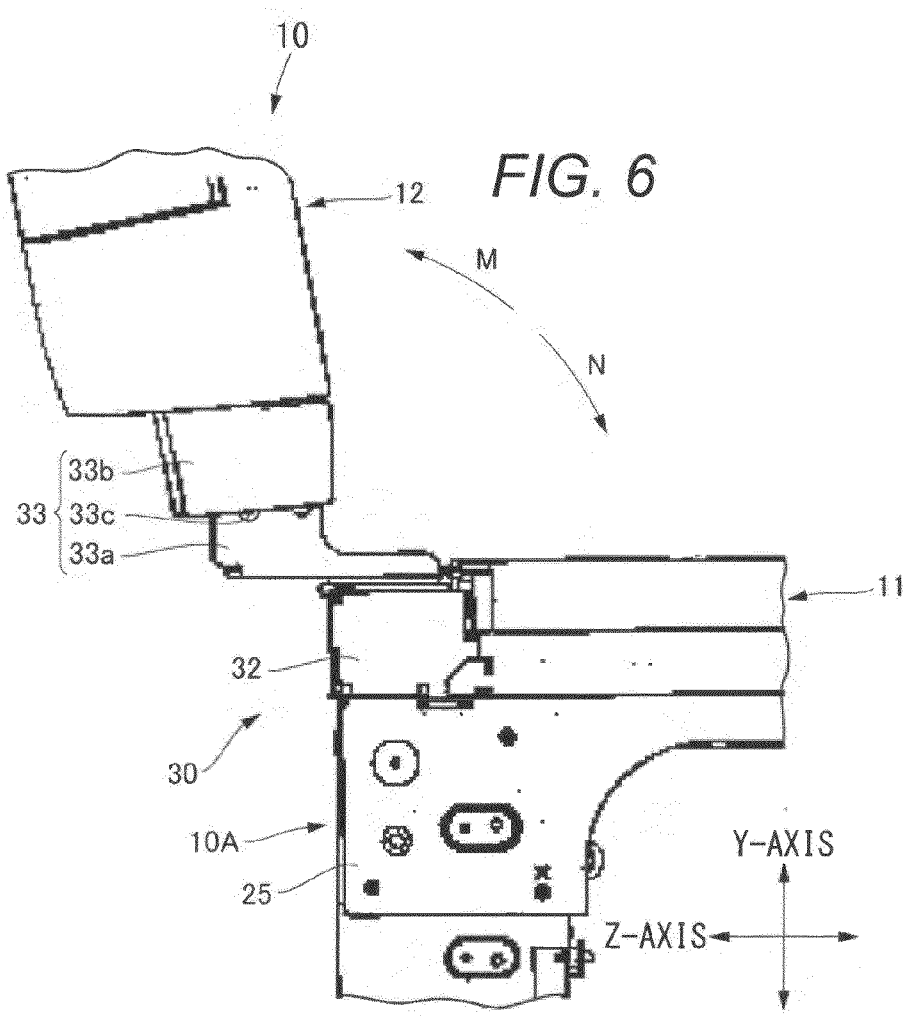
FIG. 6 is a view illustrating an outer appearance corresponding to FIG. 3.
Figure 7:
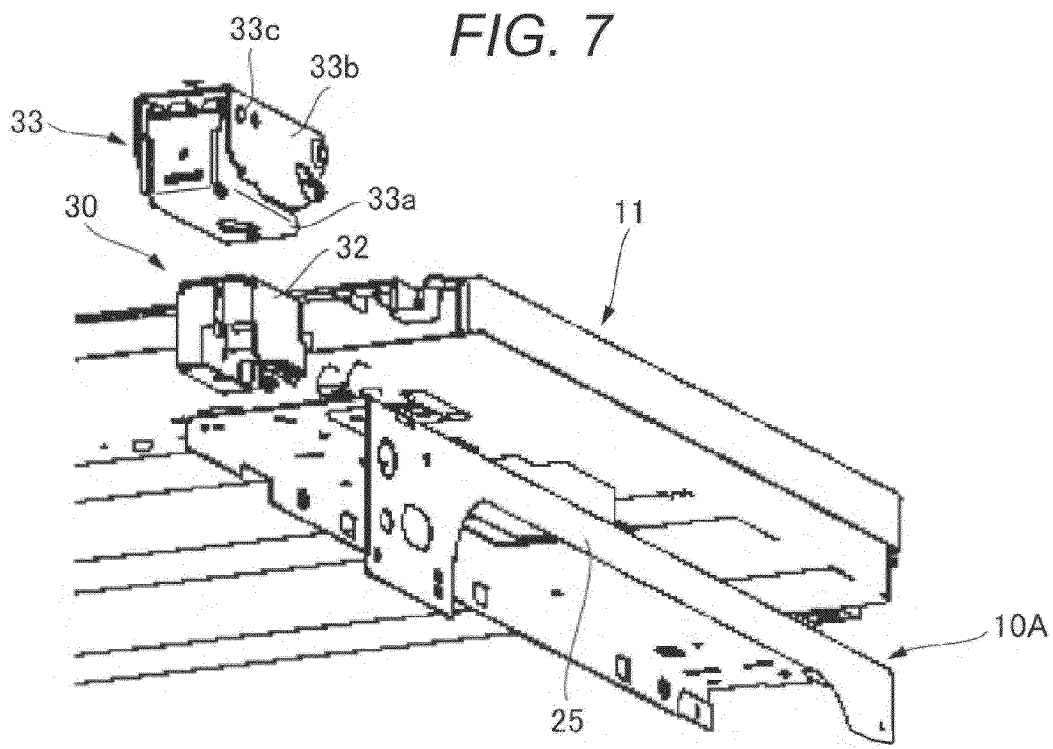
FIG. 7 is an exploded perspective view illustrating the hinge mechanism as viewed in a direction indicated by the arrow VII in FIG. 2.
Figure 8:
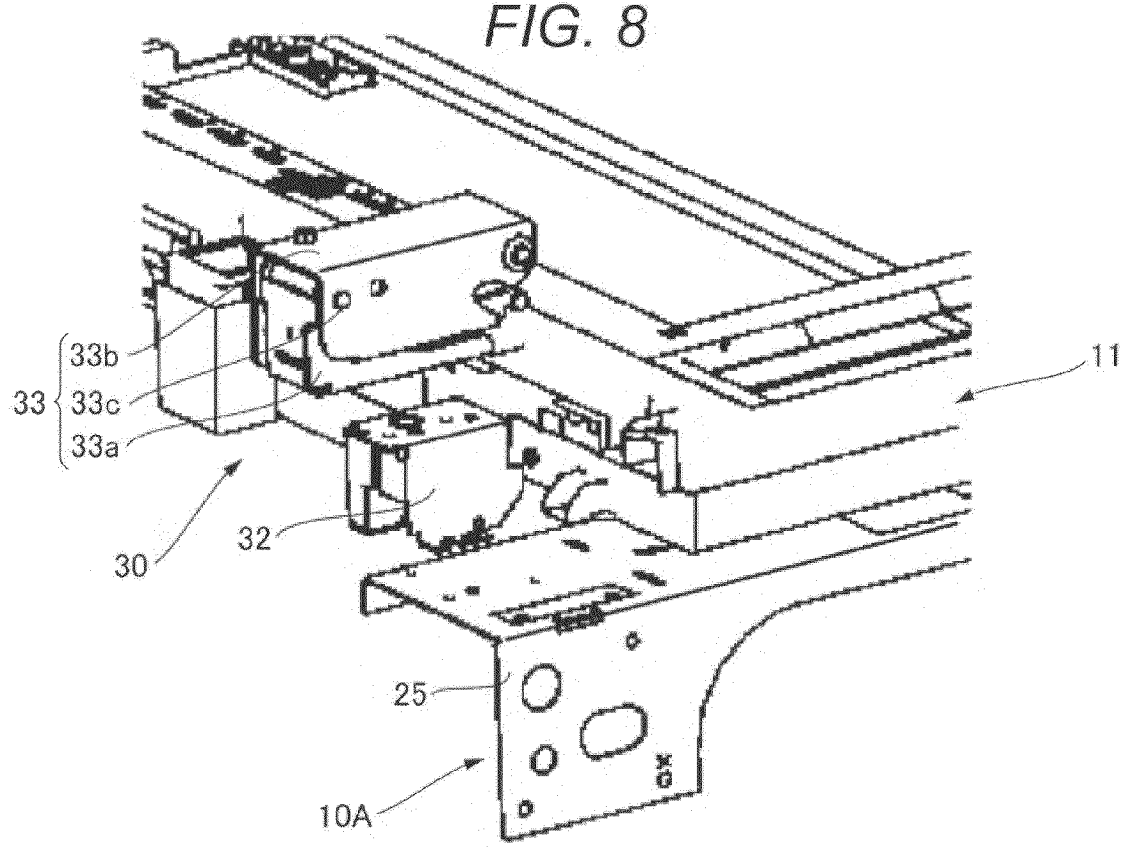
FIG. 8 is an exploded perspective view illustrating the hinge mechanism.
Figure 11:
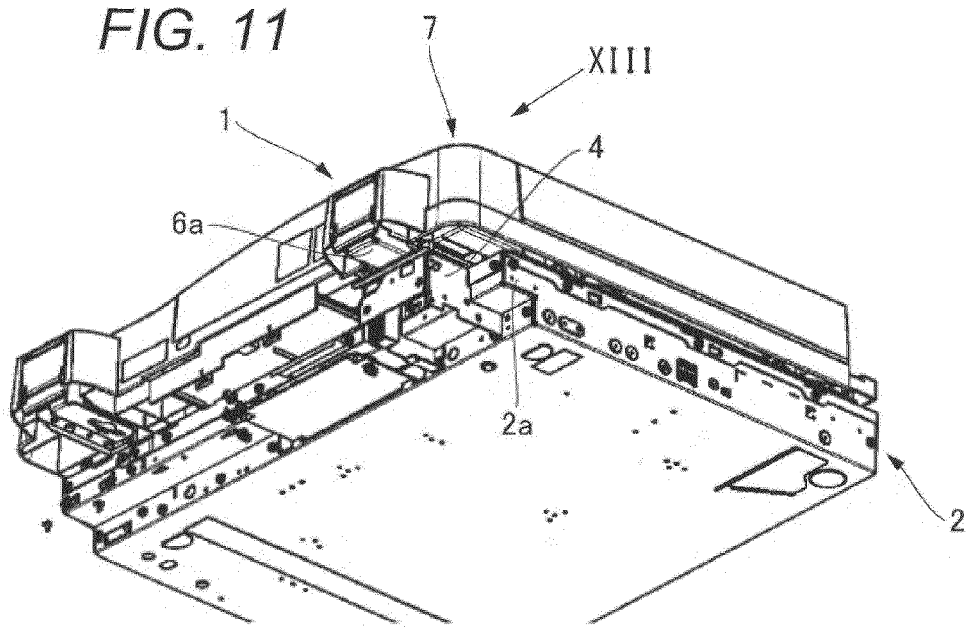
FIG. 11 is a view illustrating a conventional hinge mechanism as viewed in an oblique upper direction on a far side in a state in which a cover of a main body is removed.
Figure 12:
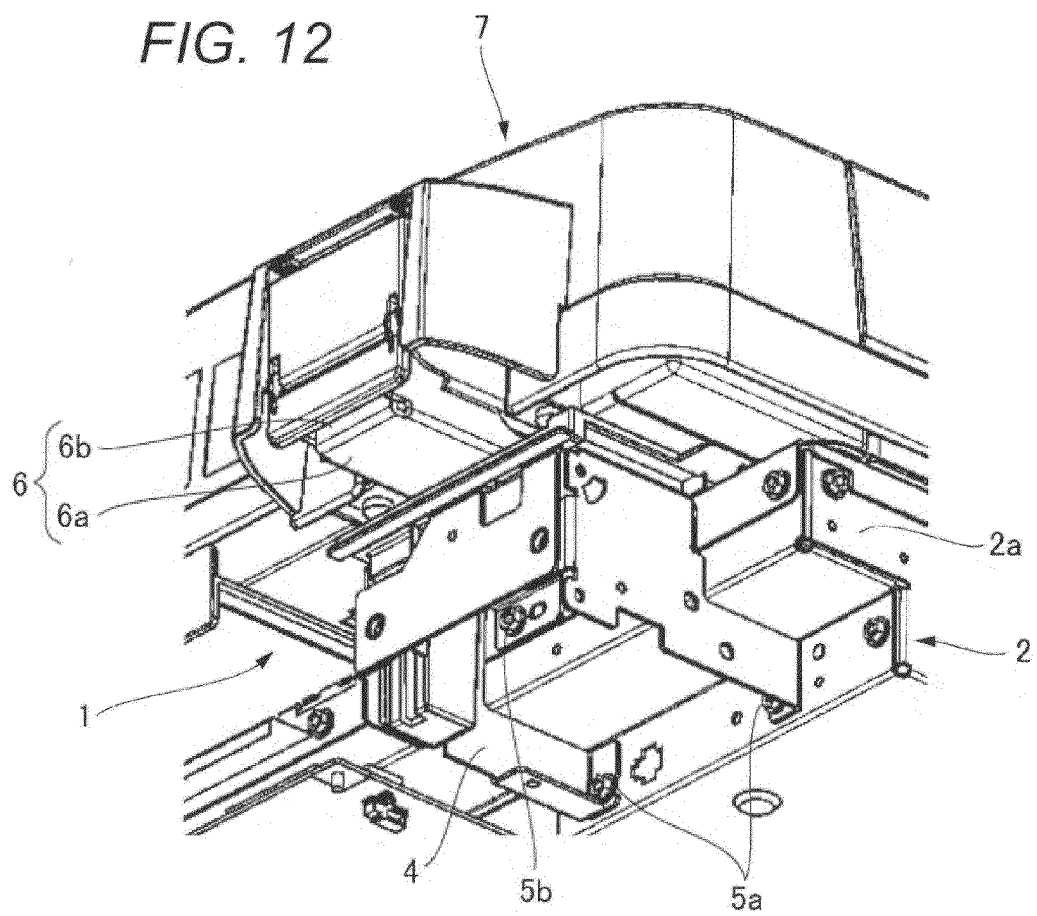
FIG. 12 is an enlarged view illustrating the hinge mechanism of FIG. 11 in a state in which the cover of the main body is removed.
Figure 13:
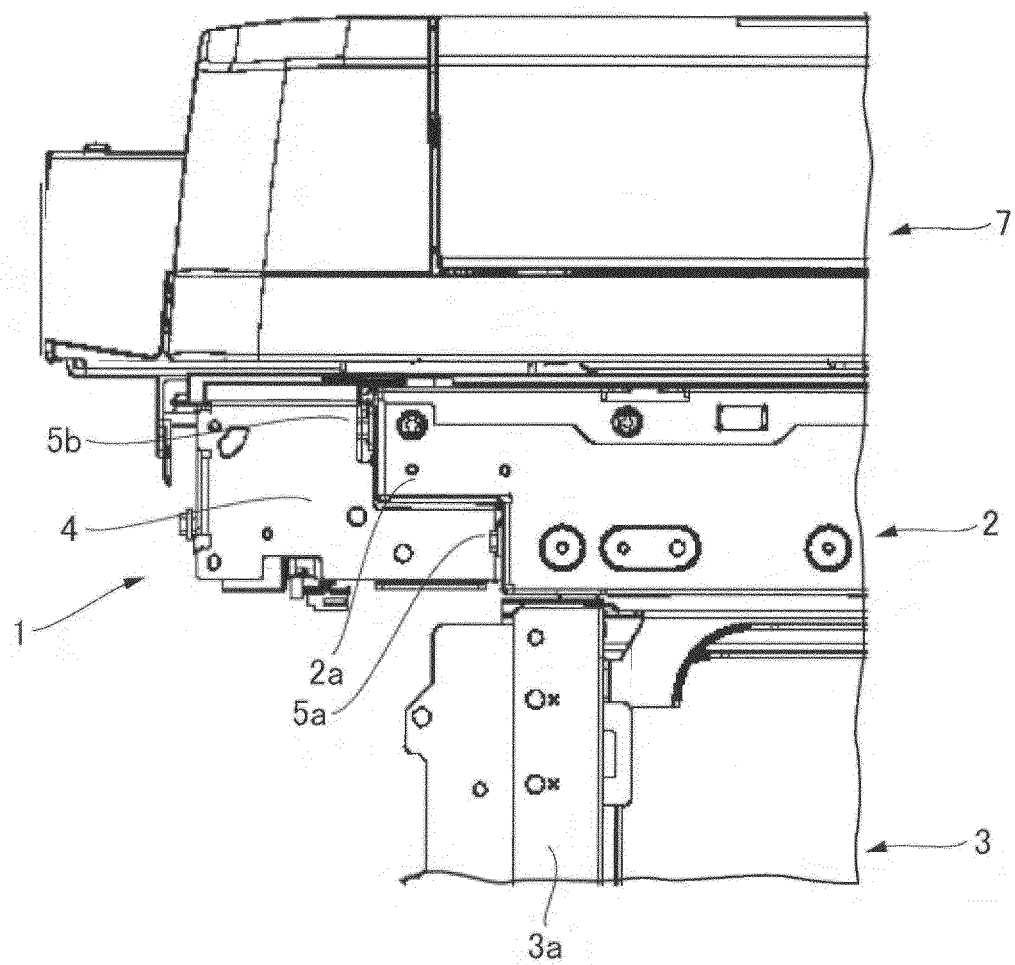
FIG. 13 is a view illustrating an outer appearance of the conventional hinge mechanism as viewed in a direction indicated by the arrow XIII in FIG. 11.

FIG. 2 is a schematic sectional view taken along the line II-II of FIG. 1, for illustrating a state in which an upper surface of the image reading apparatus 11 is closed by the document feeding apparatus 12. FIG. 3 is a schematic sectional view illustrating a state in which the document feeding apparatus 12 is raised from the state of FIG. 2 toward a far side of the image forming apparatus 10 to open the upper surface of the image reading apparatus 11. FIG. 4 is a view illustrating the hinge mechanism 30 as viewed in a direction indicated by the arrow IV in FIG. 2. FIG. 5 is an enlarged view illustrating the hinge mechanism 30 of FIG. 4. FIG. 6 is a view illustrating an outer appearance corresponding to FIG. 3. FIG. 7 is an exploded perspective view illustrating the hinge mechanism 30 as viewed in a direction indicated by the arrow VII in FIG. 2. FIG. 8 is an exploded perspective view illustrating the hinge mechanism 30. FIG. 9 is an enlarged view illustrating a positioning mechanism 40 of FIG. 4. FIG. 10 is an enlarged view illustrating an engagement state between a protrusion 41 and an elongated hole 42 of the positioning mechanism 40.

Note that, FIG. 1 is a view looking from a side on which the upper stands to face the image forming apparatus 10 so as to use the image forming apparatus 10. In FIG. 2, the user-standing side of the image forming apparatus 10 is referred to as "near side", and the back side of the image forming apparatus 10 in a depth direction is referred to as "far side". An axis in the depth direction of the image forming apparatus 10 is referred to as "Z-axis", an axis in a horizontal direction in FIG. 1 is referred to as "X-axis", and an axis in a vertical direction in FIG. 1 is referred to as "Y-axis".

The hinge mechanism 30 includes a rectangular hinge base 32, which is fixed by screws 31a and nuts 31b to a frame 25 which forms the apparatus main body 10A of the image forming apparatus 10. The hinge base 32 is located in the back on the far side of the image reading apparatus 11, but is independently provided to the frame 25 without being fixed to the image reading apparatus 11. An upper surface 32a of the hinge base 32 is formed into a horizontal surface along the Z-axis and the X-axis.

The document feeding apparatus 12 is mounted to the hinge base 32 by a hinge 33. The hinge 33 includes a lower hinge piece 33a, an upper hinge piece 33b, and a coupling sheet 33c.

The lower hinge piece 33a as one of the hinge pieces of the hinge 33 is fixed to the horizontal upper surface 32a of the hinge base 32 by screws 34a and nuts 34b. The upper hinge piece 33b as another of the hinge pieces of the hinge 33 is fixed to a part of the document feeding apparatus 12 on the far side by screws 35. The paired hinge pieces 33a and 33b are coupled to each other by the coupling shaft 33c extending in a direction parallel to the X-axis. The upper hinge piece 33b is configured to pivot with respect to the lower hinge piece 33a in the directions indicated by the arrows M and N along a plane including the Y-axis and the Z-axis. The coupling shaft 33c is located on the far side. Therefore, the hinge 33 is configured to pivot in a state in which an end portion of the upper hinge piece 33b on the near side is opened and closed with respect to the lower hinge piece 33a. The hinge pieces 33a and 33b have a U-shaped cross section along the X-axis with their opening portions facing each other, and have such an arrangement relationship that the upper hinge piece 33b covers the lower hinge piece 33a. In other words, the hinge pieces 33a and 33b have such an arrangement relationship that the lower hinge piece 33a is nested in the upper hinge piece 33b.

The image reading apparatus 11 is located on the near side of the hinge base 32 at a position between the apparatus main body 10A and the document feeding apparatus 12 in the vertical direction (direction along the Y-axis). The image reading apparatus 11 is also fixed to the frame 25 of the apparatus main body 10A by screws (not shown).

Thus, the document feeding apparatus 12 is fixed to the frame 25 of the apparatus main body 10A through intermediation of the hinge base 32 but without intermediation of the image reading apparatus 11. Therefore, the image reading apparatus 11 is directly fixed to the frame 25, and the document feeding apparatus 12 and the image reading apparatus 11 are independently fixed to the frame 25 of the apparatus main body 10A but are not directly fixed to each other.

With this structure, when the image reading apparatus 11 is to perform flat-bed reading of the document D, the user raises and pivots the document feeding apparatus 12 from a state of FIG. 2 in which the image reading apparatus 11 is closed by the document feeding apparatus 12, in the direction indicated by the arrow M in FIG. 3. Then, the upper surface of the platen glass 13 of the image reading apparatus 11 is opened.

In this case, a load of the document feeding apparatus 12 is applied to the frame 25 of the apparatus main body 10A via the upper hinge piece 33b, the coupling shaft 33c, the lower hinge piece 33a, and the hinge base 32. The document feeding apparatus 12 and the image reading apparatus 11 are independently fixed to the frame 25 but are not directly coupled to each other, and hence, in the state in which the document feeding apparatus 12 is raised, the load of the document feeding apparatus 12 is not applied to a back portion (far side) 11a of the image reading apparatus 11 unlike the conventional image reading apparatus. Therefore, the image reading apparatus 11 does not need to have a rigid structure, but may have a simple structure. As a result, the image reading apparatus 11 may be thinned and light-weighted, and cost may be reduced due to the thinning and light-weighting.

Further, when the document feeding apparatus 12 is raised in the direction indicated by the arrow M so as to cause the image reading apparatus 11 to perform flat-bed reading of the document D, as illustrated in FIG. 3, a top portion 33d of the upper hinge piece 33b abuts against a back end 33e of the lower hinge piece 33a so that the document feeding apparatus 12 is not inclined to the back side more than necessary. Therefore, when the user raises the document feeding apparatus 12 forcefully, the top portion 33d of the upper hinge piece 33b abuts against the back end 33e of the lower hinge piece 33a forcefully, and a backward rotational moment may be applied to the hinge base 32 to which the lower hinge piece 33a is fixed. However, the hinge base 32 and the image reading apparatus 11 are provided separately so as to only abut against each other, and hence the rotational moment is not applied to the image reading apparatus 11. The hinge mechanism 30 is moved in a direction of opening the document feeding apparatus 12 to only separate from the image reading apparatus 11. Thus, the image reading apparatus 11 does not need to have a rigid structure in accordance with the usage for the user.

By the way, the document feeding apparatus 12 and the image reading apparatus 11 are independently fixed to the frame 25 and provided separately without being directly coupled to each other. When a relationship between relative positions of the document feeding apparatus 12 and the image reading 11 in the direction along the X-axis is not determined accurately, however, the document reading accuracy of the image reading apparatus 11 may be decreased.

When the image reading apparatus 11 is to perform sheet-through reading of the document D, in FIG. 1, the document D is fed in a direction indicated by the arrow F along the X-axis, and passes above the light-emitting reading portion 14 of the image reading apparatus 11 which has stopped its movement. In this case, when the document D is uplifted from the platen glass 13, the image reading apparatus 11 cannot read the document D accurately. Therefore, in order to suppress the uplifting of the document D, a guide member 26 is provided to the document feeding apparatus 12. In this case, when there is a deviation in a predetermined relationship between relative positions of the guide member 26 and the light-emitting reading portion 14, the image reading apparatus 11 may read an uplifted portion of the document D which is not held by the guide member 26, with the result that the image reading apparatus 11 cannot read the document D accurately.

Therefore, as a positioning unit configured to accurately determine the relationship between the relative positions of the document feeding apparatus 12 and the image reading apparatus 11 in the document feeding direction (direction along the X-axis) of the document feeding apparatus 12, the positioning mechanism 40 is provided between the hinge base 32 of the hinge mechanism 30 and the image reading apparatus 11.

The positioning mechanism 40 comprises the protrusion 41 protrudingly provided on the back portion (far side) 11a of the image reading apparatus 11, and the elongated hole 42 formed in the hinge base 32 of the hinge mechanism 30 and serving as a fitting portion to be fitted onto side portions 41a of the protrusion 41 which extend in the document feeding direction (direction indicated by the arrow F, or direction along the X-axis).

The protrusion 41 is provided so as to protrude in a direction (direction along the Z-axis) crossing the document feeding direction (direction along the X-axis) of the document feeding apparatus 12 and a direction (direction along the Y-axis, or vertical direction) in which the hinge mechanism 30 supports the document feeding apparatus 12. In other words, the protrusion 41 (FIGS. 2 and 3) further extends from the back portion (far side) 11a of the image reading apparatus 11 toward the far side. The elongated hole 42 of FIG. 10 is an oblong fitting hole extending along the direction (direction along the Y-axis, or vertical direction) in which the hinge mechanism 30 supports the document feeding apparatus 12. The elongated hole 42 serving as the fitting hole portion has edges 42a extending along the vertical direction, and at least one of the edges 42a is fitted onto corresponding one of the side portions 41a of the protrusion 41 which extend in the document feeding direction.

Note that, it is only necessary that the protrusion 41 be formed on at least one of the back portion 11a of the image reading apparatus 11 and the hinge base 32 of the hinge mechanism 30, and the elongated hole 42 be formed on another of the back portion 11a of the image reading apparatus 11 and the hinge base 32 of the hinge mechanism 30. The shape of the protrusion 41 may be a circular boss shape instead of the cross shape as illustrated in FIG. 10.

The protrusion 41 is inserted into the elongated hole 42, and the side portions 41a of the protrusion 41 are fitted to the edges 42a of the elongated hole 42. Thus, the positioning mechanism 40 may determine the relative positions of the document feeding apparatus 12 and the image reading apparatus 11 in the document feeding direction (direction along the X-axis). The image reading apparatus 11 which is positioned relative to the document feeding apparatus 12 is fixed to the apparatus main body 10A.

As a result, the positioning mechanism 40 may determine the relative positions of the document feeding apparatus 12 and the image reading apparatus 11 without directly fixing the document feeding apparatus 12 and the image reading apparatus 11 to each other.

Thus, it is possible to improve the document reading accuracy of the image reading apparatus 11 for the document D which is fed by the document feeding apparatus 12.

Further, the positioning mechanism 40 performs, by the protrusion 41 and the elongated hole 42, the positioning in the horizontal direction (direction along the X-axis) orthogonal to the vertical direction (direction along the Y-axis), in which the load of the document feeding apparatus 12 is to be applied. Therefore, the load of the document feeding apparatus 12 is not applied to the image reading apparatus 11.

The hinge mechanism 30 is fixed to the apparatus main body 10A, and abuts against the image reading apparatus 11 fixed to the apparatus main body 10A. When the document feeding apparatus 12 is opened, the hinge mechanism 30 moves in a direction (the direction indicated by the arrow M) of opening the document feeding apparatus 12 to separate from the image reading apparatus 11. The direction in which the protrusion 41 is protrudingly provided is a direction in which the hinge mechanism 30 separates from the image reading apparatus 11. When the document feeding apparatus 12 is opened and pivoted in the direction indicated by the arrow M (FIG. 3), the hinge base 32 may be bent in a direction away from the image reading apparatus 11 (direction separating from the image reading apparatus 11). Even in this case, the elongated hole 42 only moves alone the protrusion 41 together with the hinge base 32, and hence no external force is applied to the image reading apparatus 11.

Thus, even though the positioning mechanism 40 is provided, the image reading apparatus 11 does not need to have a rigid structure, and there is no hindrance in simplifying the structure of the image reading apparatus 11 and thinning the image reading apparatus 11.

Further, the protrusion 41 extends in the horizontal direction, and hence, in a state in which the document feeding apparatus 12 is mounted to the apparatus main body 10A by the hinge mechanism 30, the image reading feeding apparatus 11 may be inserted and pulled away in the direction along the Z-axis from the space between the document feeding apparatus 12 and the apparatus main body 10A in the vertical direction. Thus, the image reading apparatus 11 may easily be mounted to and removed from the apparatus main body 10A irrespective of the document feeding apparatus 12.

Note that, the positioning of the image reading apparatus 11 in the vertical direction (direction along the Y-axis) is performed by bringing a seating surface of the image reading apparatus 11 and a seating surface of the frame 25 of the apparatus main body 10A into abutment against each other. Further, through holes 36 for the screws 34a fixing one of the right and left hinge bases 32 have a diameter larger than a thickness of the screws 34a. This enables the document feeding apparatus 12 to rotate about the Y-axis to perform a fine adjustment of the relative positions of the image reading apparatus 11 and the document feeding apparatus 12 in a plane including the X-axis and the Z-axis.

In the image forming apparatus 10 according to this embodiment, the document feeding apparatus 12 is directly fixed, through the hinge mechanisms 30, to the apparatus main body 10A located below the image reading apparatus 11 in the state in which the document feeding apparatus 12 is openable and closable with respect to the image reading apparatus 11. Therefore, when the document feeding apparatus 12 is pivoted and opened, the load of the document feeding apparatus 12 is exerted on the apparatus main body 10A but is not exerted on the image reading apparatus 11. Thus, the image reading apparatus 11 of the image forming apparatus 10 according to this embodiment does not need to have a rigid structure so that the document feeding apparatus 12 may be fixed and supported.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-240900, filed Oct. 31, 2012, which is hereby incorporated by reference herein in its entirety.

What is claimed is:

1. An image forming apparatus, comprising:
   an image forming unit configured to form an image on a sheet;
   an image reading unit configured to read a document, the image reading unit being provided on the image forming unit;
   a document feeding unit configured to feed the document to the image reading unit;
   a hinge unit configured to openably and closably support the document feeding unit, the hinge unit being fixed to the image forming unit independently of the image reading unit; and
   a positioning mechanism configured to determine relative positions of the image reading unit and the document feeding unit with respect to a document feeding direction of the document feeding unit.

2. An image forming apparatus according to claim 1, wherein the positioning mechanism determines the positions of the image reading unit fixed to the image forming unit and the hinge unit supporting the document feeding unit in the document feeding direction of the document feeding unit.

3. An image forming apparatus according to claim 1, wherein the hinge unit contacts the image reading unit when the document feeding unit is closed, and
   the hinge unit is bent in a direction away from the image reading unit when the document feeding unit is opened.

4. An image forming apparatus according to claim 1, wherein the positioning mechanism comprises a protrusion provided on one of the hinge unit and the image reading unit and fitted into a fitting hole portion formed in another of the hinge unit and the image reading unit.

5. An image forming apparatus according to claim 4, wherein the protrusion and the fitting hole are moved relative to each other along the protrusion when the document feeding unit is opened.

6. An image forming apparatus according to claim 4, wherein the fitting hole portion comprises an elongated fitting hole extending along a vertical direction.

* * * * *